(12) United States Patent
Chen et al.

(10) Patent No.: US 9,563,055 B2
(45) Date of Patent: Feb. 7, 2017

(54) LISSAJOUS DUAL-AXIAL SCAN COMPONENT AND SCAN FREQUENCY GENERATION METHOD THEREOF

(71) Applicant: INDUSTRIAL TECHNOLOGY RESEARCH INSTITUTE, Hsinchu (TW)

(72) Inventors: Chung-De Chen, Chiayi (TW); Pin Chang, Hsinchu (TW); Yao-Hui Lee, Tainan (TW); Yu-Jen Wang, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 25 days.

(21) Appl. No.: 14/253,600

(22) Filed: Apr. 15, 2014

(65) Prior Publication Data

US 2015/0286048 A1 Oct. 8, 2015

(30) Foreign Application Priority Data

Apr. 2, 2014 (CN) .......................... 2014 1 0131428

(51) Int. Cl.
G02B 26/08 (2006.01)
G02B 26/10 (2006.01)

(52) U.S. Cl.
CPC ....... G02B 26/0841 (2013.01); G02B 26/0833 (2013.01); G02B 26/101 (2013.01); *G02B 26/085* (2013.01); *G02B 26/0858* (2013.01)

(58) Field of Classification Search
CPC ..... G02B 26/10; G02B 26/101; G02B 26/115; G02B 26/0833–26/0858; G02B 26/105; G02B 26/085; G02B 26/033; B81B 3/0083; B81B 3/0086; B81B 2203/04
(Continued)

(56) References Cited

U.S. PATENT DOCUMENTS 7,847,997 B2   12/2010   Sandner et al.
7,972,011 B2    7/2011   Kurozuka et al.
(Continued)

FOREIGN PATENT DOCUMENTS

CN    101896851 A    11/2010
TW    201033723 A     9/2010
(Continued)

OTHER PUBLICATIONS

Christopher L. Hoy et al., Fast-updating and nonrepeating Lissajous image reconstruction method for capturing increased dynamic information, Applied Optics, 2011, p. 2376-2382, vol. 50, No. 16.
(Continued)

*Primary Examiner* — Zachary Wilkes
*Assistant Examiner* — George G King
(74) *Attorney, Agent, or Firm* — Locke Lord LLP; Tim Tingkang Xia, Esq.

(57) ABSTRACT

Disclosed herein are a Lissajous dual-axial scan component and a scan frequency generation method thereof. The Lissajous dual-axial scan component scans at a fast-axial resonant frequency and a slow-axial resonant frequency. A fast-axial bias frequency and a slow-axial bias frequency are determined according to the fast-axial resonant frequency and the slow-axial resonant frequency. Fast-axial positive integers and slow-axial positive integers are determined according to a system frequency, the fast-axial bias frequency, and the slow-axial bias frequency. An irreducible fraction is determined according to the fast-axial positive integers and the slow-axial positive integers as a ratio of the fast-axial bias frequency to the slow-axial bias frequency less than 10. A scan trace repetition frequency greater than 24 Hz is determined according to the irreducible fraction in order that the Lissajous dual-axial scan component scans according to the scan trace repetition frequency.

7 Claims, 7 Drawing Sheets

(58) Field of Classification Search
USPC ............ 359/196.1–202.1, 212.1–214.1, 359/198.1–199.4, 200.6–200.8, 221.2, 359/223.1–225.1, 226.2, 904, 290–295, 838, 359/846, 871, 872; 250/204, 559.06, 559.29, 250/230, 234; 347/255–260; 353/39, 98–99; 385/15–18, 22; 398/12, 19, 45

See application file for complete search history.

(56) References Cited

U.S. PATENT DOCUMENTS

| | | | |
|---|---|---|---|
| 7,972,014 B2 | 7/2011 | Hung et al. | |
| 2004/0218155 A1 | 11/2004 | Schenk et al. | |
| 2005/0253055 A1* | 11/2005 | Sprague et al. | 250/234 |
| 2006/0284790 A1 | 12/2006 | Tegreene et al. | |
| 2008/0218826 A1 | 9/2008 | Desaulniers | |
| 2009/0091666 A1 | 4/2009 | Kurozuka et al. | |
| 2011/0122101 A1* | 5/2011 | Kurozuka | 345/204 |
| 2012/0075685 A1* | 3/2012 | Hofmann et al. | 359/200.6 |
| 2012/0293850 A1* | 11/2012 | Yamamoto | G02B 26/101 359/212.1 |
| 2012/0320379 A1* | 12/2012 | Hofmann et al. | 356/445 |

FOREIGN PATENT DOCUMENTS

| | | |
|---|---|---|
| TW | M389265 | 9/2010 |
| TW | 201200905 A | 1/2012 |

OTHER PUBLICATIONS

Tomas Tuma et al., High-speed multiresolution scanning probe microscopy based on Lissajous scan trajectories, Nanotechnology, 2012, p. 1-8, 23, 185501 (9pp).

Heinrich Gruger et al., New approach for MEMS scanning mirror for laser projection systems, Proc. of SPIE, vol. 6887, 68870L-1-6.

M. Scholles et al., Ultra compact laser projection systems based on two-dimensional resonant micro scanning mirrors, Proc. of SPIE, vol. 6466, 64660A-1-12.

Ulrich Hofmann et al., Wafer-level vacuum packaged micro-scanning mirrors for compact laser projection displays, Proc. of SPIE, vol. 6887, 688706-1-15.

State Intellectual Property Office of the P. R. C, "Office Action", May 12, 2016, China.

* cited by examiner

LISSAJOUS DUAL-AXIAL SCAN COMPONENT AND SCAN FREQUENCY GENERATION METHOD THEREOF

CROSS-REFERENCE TO RELATED APPLICATIONS

This non-provisional application claims priority under 35 U.S.C. §119(a) on Patent Application No. 201410131428.X filed in People's Republic of China on Apr. 2, 2014, the entire contents of which are hereby incorporated by reference.

TECHNICAL FIELD

The embodiments disclosed herein relate to a Lissajous dual-axial scan component and a scan frequency generation method thereof.

BACKGROUND

Micro-projection devices include pico-projectors and pocket projectors. The smaller, lighter pico-projectors are primarily integrated with mobile devices, e.g. cell phones, ultra-mobile PCs, and digital still cameras, and powered by the batteries of the mobile devices, but there are also independent pico-projectors. Pocket projectors are similar to traditional ones, only smaller and lighter.

Pico-projectors measuring only a few centimeters wide and a few micrometers thick have been developed to be embedded on cell phones. A pico-projector needs one dual-axial scan component or two single-axial scan components to project to a two-dimensional screen by laser scan. There are roughly two types of dual-axial scan projection: raster scan and Lissajous scan. The two axes are generally a fast axis and a slow axis. The slow axis of a raster scan must be kept at 60 Hz and the fast axis is usually above 18 kHz to attain high-quality, high-resolution, and non-flickering projected screens. It is impossible for the resonant frequency of a scan component to be as low as 60 Hz; hence the component is forced-actuated quasi-statically to vibrate at that frequency.

$$\theta = \frac{T}{K},$$

The quasi-static force is related to the scanning angle by where T is the torque caused by the driving force, K is the stiffness of the twisting axis, and θ is the scanning angle. The greater the force, the larger the angle. The scanning angle can also be increased by lowering K and sacrificing the strength of the component, where the twisting axis is easily broken. A large K, however, implies increased driving force and power consumption, despite strengthening the component.

The slow axis of a Lissajous scan is not limited to 60 Hz, but configurable according to the scan structure. When the actuator drives at the resonant frequency, the scanning angle is expressed as $$\theta = Q\frac{T}{K},$$

where Q is the quality factor of the component. Q is greater than 1500 for a common scan component made of silicon. Resonance, therefore, significantly magnifies vibrational displacement, achieving large-angle scanning even with a smaller force and lower power consumption (50 mW for instance). Consequently a Lissajous scan component can be configured to different resonant frequencies according to need and is thus more flexible in structural design.

In short, a raster scan component consumes more power but generates projections with parallel lines, less flicker, and higher scan line coverage. A Lissajous scan component, driven vertically and horizontally at resonant frequencies, consumes less power, but is less predictable with its complex scan trace, which calls for additional analysis and research. Moreover, whether a Lissajous scan screen flickers is a question of the scan line density and the frequency ratio.

SUMMARY

The present disclosure provides a scan frequency generation method of a Lissajous dual-axial scan component. The Lissajous dual-axial scan component scans at a fast-axial resonant frequency and a slow-axial resonant frequency. A fast-axial bias frequency and a slow-axial bias frequency are determined according to the fast-axial resonant frequency and the slow-axial resonant frequency. A plurality of fast-axial positive integers and a plurality of slow-axial positive integers are determined according to a system frequency, the fast-axial bias frequency, and the slow-axial bias frequency. An irreducible fraction is determined according to the fast-axial positive integers and the slow-axial positive integers. The irreducible fraction is a ratio of the fast-axial bias frequency to the slow-axial bias frequency, the ratio being less than 10. A scan trace repetition frequency is determined according to the irreducible fraction in order that the Lissajous dual-axial scan component scans according to the scan trace repetition frequency, which is greater than 24 Hz.

The present disclosure also provides a Lissajous dual-axial scan component comprising a frame, a mass, a mirror, a pair of fast axes, and a pair of slow axes. When the Lissajous dual-axial scan component is driven, the fast axes are configured to twist at a fast-axial resonant frequency and the slow axes are configured to twist at a slow-axial resonant frequency. The mass is connected to the frame through the pair of slow axes. The mirror is connected to the mass through the pair of fast axes. The Lissajous dual-axial scan component, when driven, scans according to a scan trace repetition frequency and a ratio of a fast-axial bias frequency to a slow-axial bias frequency. The scan trace repetition frequency is greater than 24 Hz. The ratio is less than 10. The fast-axial bias frequency and the slow-axial bias frequency are determined according to the fast-axial resonant frequency and the slow-axial resonant frequency.

BRIEF DESCRIPTION OF THE DRAWING

The present disclosure will become more fully understood from the detailed description given hereinbelow and the accompanying drawings which are given by way of illustration only and thus are not limitative of the present disclosure and wherein.

DETAILED DESCRIPTION

The embodiments hereby disclosed of a Lissajous dual-axial scan component and a scan frequency generation method attend to both coverage and flicker issues of Lissajous scan projections, enhancing scan line density and resolution.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
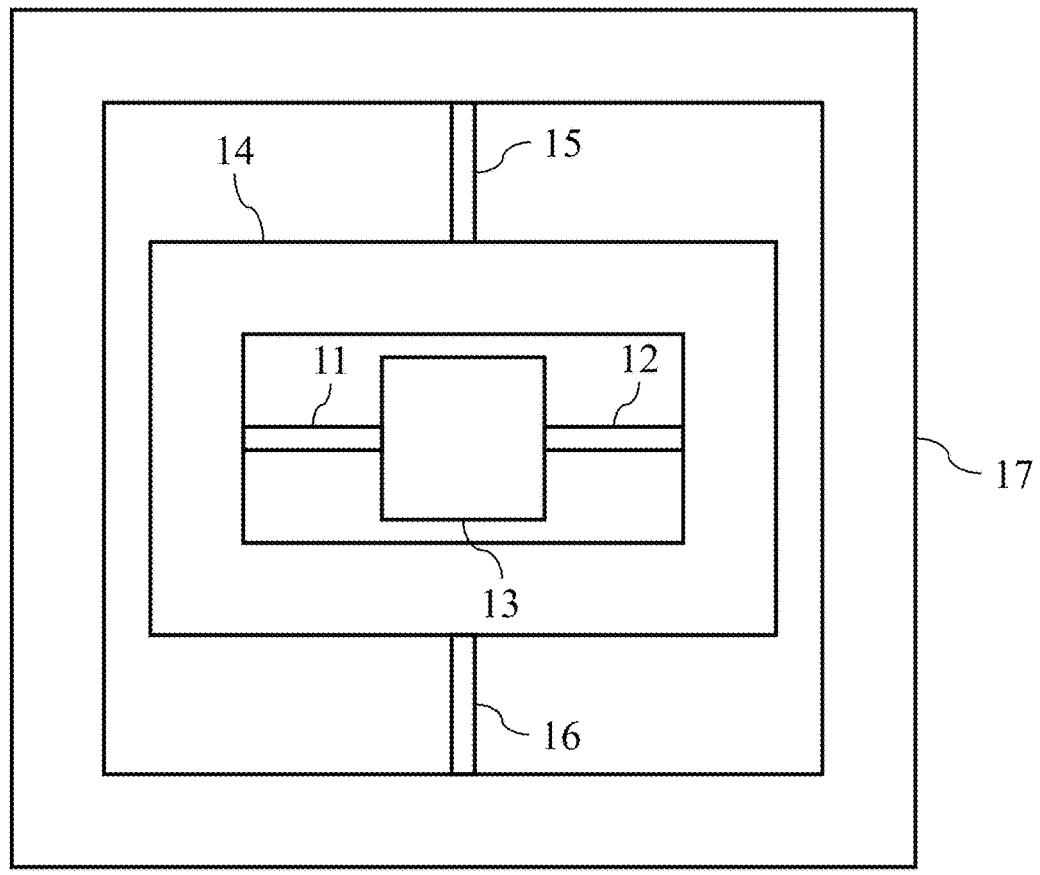
FIG. 1 illustrates a Lissajous dual-axial scan component, in accordance with an embodiment disclosed.

A Lissajous dual-axial scan component (hereafter referred to as the component) is depicted in FIG. 1. Please note that the shape, size, and dimensions of the component in the figure are for illustration only and not limitative of the shape, size, and dimensions of an actual component. The component comprises fast axes 11 and 12, slow axes 15 and 16, a mirror 13, a mass 14, and a frame 17. The mirror 13 is disposed at the center and connected to the mass 14 through the pair of fast axes 11 and 12. The mass 14 is connected to the frame 17 through the pair of slow axes 15 and 16. Laser light shines upon the mirror 13 and is reflected to a screen. When the component is driven by an actuator, the fast axes 11 and 12 twist at a fast-axial resonant frequency, causing the mirror 13 to perform fast-axial scan, and the slow axes 15 and 16 twist at a slow-axial resonant frequency, causing the mirror 13 to perform slow-axial scan. The fast axes 11 and 12 are perpendicular to the slow axes 15 and 16, thus bringing forth scan projections.

The component, when driven, scans according to a scan trace repetition frequency greater than 24 Hz and a ratio of a fast-axial bias frequency to a slow-axial bias frequency, the ratio being less than 10. The fast-axial bias frequency and the slow-axial bias frequency are determined according to the fast-axial resonant frequency and the slow-axial resonant frequency.

In one embodiment, the component may be piezoelectrically, electrostatically, or electromagnetically driven. In one embodiment, the component is made of piezoelectric material.

Figure 2:
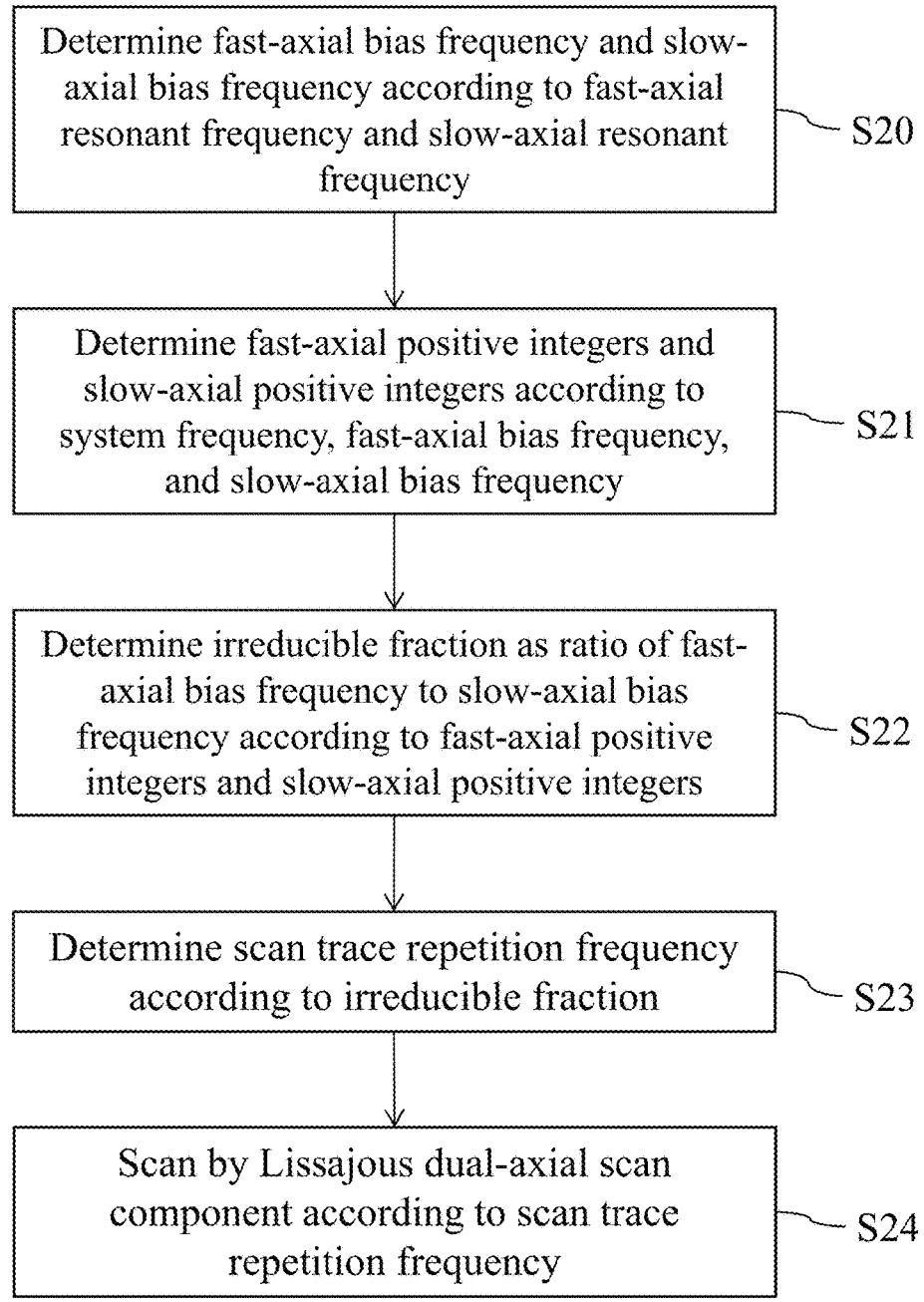
FIG. 2 illustrates is a scan frequency generation method of a Lissajous dual-axial scan component, in accordance with an embodiment disclosed.

A scan frequency generation method of the component is depicted in FIG. 2. The component has two resonant frequencies $f_{x0}$ and $f_{y0}$. The component magnifies the scanning angles by resonance. The scanning angles are at their maxima when the driving frequencies are $f_x=f_{x0}$ and $f_y=f_{y0}$.

In practice, the driving frequencies may deviate from the resonant frequencies. Despite slight decrease in the scanning angles, the driving frequencies can be more flexibly chosen thus, relatively speaking. Therefore, the fast- and slow-axial bias frequencies can be chosen according to the resonant frequencies associated with maximum scanning angles.

To begin with, the fast-axial bias (driving) frequency $f_x$ and the slow-axial bias (driving) frequency $f_y$ are determined S20 according to the fast-axial resonant frequency $f_{x0}$ and the slow-axial resonant frequency $f_{y0}$. A plurality of fast-axial positive integer M's and a plurality of slow-axial positive integer N's are then determined S21 according to $f_x$, $f_y$, and a system frequency $f_{clk}$. In one embodiment, the fast- and slow-axial frequencies are found according to $$f_x = \frac{f_{clk}}{N} \text{ and } f_y = \frac{f_{clk}}{M}.$$

All possible M's and N's are thereby obtained. Assume that there are i fast-axial positive integers $M_1, M_2, \ldots,$ and j slow-axial positive integers $N_1, N_2, \ldots, N_j$, then there are i·j frequency combinations. Two positive integers M and N are chosen so that $f_x=a\cdot M$ and $f_y=a\cdot N$, where a is an arbitrary number. As a result, $$\frac{f_x}{f_y} = \frac{M}{N}.$$

The resonant frequencies are related to the bias frequencies by $$|f_x - f_{x0}| \leq \Delta f_x$$

$$|f_y - f_{y0}| \leq \Delta f_y$$

where $\Delta f_x$ is the fast-axial frequency bias and $\Delta f_y$ is the slow-axial frequency bias. Consequently, $$\left| \frac{f_{clk}}{N} - f_{x0} \right| \leq \Delta f_x$$

$$\left| \frac{f_{clk}}{M} - f_{y0} \right| \leq \Delta f_y$$

In other words, $$\frac{f_{clk}}{f_{x0} - \Delta f_x} \geq N \geq \frac{f_{clk}}{f_{x0} + \Delta f_x}$$

$$\frac{f_{clk}}{f_{y0} - \Delta f_y} \geq M \geq \frac{f_{clk}}{f_{y0} + \Delta f_y}$$

The M's and N's can be obtained according to the above inequalities.

An irreducible fraction, as a ratio of a fast-axial bias frequency to a slow-axial bias one, or $f_x$ to $f_y$, is determined S22 according to the M's and N's. The ratio is less than 10. Each of the found frequency combinations corresponds to an irreducible fraction m/n. A scan trace repetition frequency $f_{rep}$ is determined S23 according to the irreducible fraction m/n and the equation $$f_{rep} = \frac{f_x}{m} = \frac{f_y}{n} \cdot f_{rep}$$

needs to be greater than 24 Hz. Lowering m/n by increasing the slow-axial bias frequency provides a balance between high coverage of and less flicker on the screen. Finally, the component scans S24 according to $f_{rep}$.

The scan frequency generation method described above is hereby elaborated upon, especially regarding the determination of the ratio as less than 10 and $f_{rep}$ as greater than 24 Hz.

A Lissajous scan takes time t as a parameter. The scan trace are defined as $$x(t) = A \sin(2\pi \cdot f_x \cdot t)$$

$$y(t) = B \sin(2\pi \cdot f_y \cdot t + \phi)$$

where A and B are constants, $f_x$ is a fast-axial bias frequency, $f_y$ is a slow-axial bias frequency, and $\phi$ is a phase difference. According to the above definition, the scan trace forms a projected screen of area $2A \cdot 2B = 4AB$.

In one embodiment, the frequencies are generated with a divider; that is, $f_x$ and $f_y$ are derived from a system frequency $f_{clk}$ with the use of a counter. Specifically, the counter generates the integers M and N, and $$a = \frac{f_{clk}}{M \cdot N}$$

is taken. It follows that $$f_x = \frac{f_{clk}}{N} \text{ and } f_y = \frac{f_{clk}}{M}.$$

The aforesaid ratio is then $$r = \frac{f_x}{f_y} = \frac{M}{N} = \frac{m}{n},$$

where m/n is the irreducible fraction, m and n are coprime, and r is rational. Please note that as long as r is rational, it does not matter how the frequencies are generated, the divider being only an example.

In another embodiment, the frequencies are determined with a direct digital synthesizer (DDS). Specifically, the counter decides the integers M and N, and $$a = \frac{f_{clk}}{2^q}$$

is taken, where q is an arbitrary positive integer. It follows that $$f_x = \frac{f_{clk} M}{2^q} \text{ and } f_y = \frac{f_{clk} N}{2^q}.$$

In yet another embodiment, the frequencies are determined with a phase lock loop (PLL). Specifically, the counter decides the integers M, N, and p, and $$a = \frac{f_{clk}}{p}$$

is taken. It follows that $$f_x = \frac{f_{clk} M}{p} \text{ and } \frac{f_{clk} N}{p}.$$

Substituting the above expressions of $f_x$ and $f_y$ into the aforesaid inequalities yields various ranges of M and N.

The scan position at $t=t_0$ is $$\begin{cases} x(t_0) = A\sin(2\pi \cdot f_x \cdot t_0) \\ y(t_0) = B\sin(2\pi \cdot f_y \cdot t_0 + \phi) \end{cases}$$

Since r is rational, the scan trace repeats itself within a limited amount of time.

Consider the case where at $t=\tau$ the scan trace returns to how it was at $t=t_0$; that is, $$\begin{cases} \sin(2\pi \cdot f_x \cdot t_0) = \sin(2\pi \cdot f_x \cdot \tau) \\ \sin(2\pi \cdot f_y \cdot t_0 + \phi) = \sin(2\pi \cdot f_y \cdot \tau + \phi) \end{cases}$$

Also $$f_{rep} = \frac{1}{\tau - t_0}.$$

By periodicity of trigonometric functions, $$\begin{cases} 2\pi \cdot f_x \cdot t_0 + 2\alpha\pi = 2\pi \cdot f_x \cdot \tau \\ 2\pi \cdot f_y \cdot t_0 + 2\beta\pi = 2\pi \cdot f_y \cdot \tau \end{cases}$$

where $\alpha$ and $\beta$ are positive integers. Simplifying the above gives $$\begin{cases} \alpha = f_x(\tau - t_0) \\ \beta = f_y(\tau - t_0) \end{cases}$$

In other words, $$\frac{f_x}{f_y} = \frac{\alpha}{\beta}.$$

The irreducible fraction of $$\frac{f_x}{f_y}$$

is m/n; therefore, $\alpha=m$ and $\beta=n$ can be taken. Given that $$f_{rep} = \frac{1}{\tau - t_0},$$

it follows that $$f_{rep} = \frac{f_x}{m} = \frac{f_y}{n}.$$

$f_{rep}$ needs to be greater than 24 Hz for the projected screen not to flicker, considering the persistence of human vision.

Figure 3:
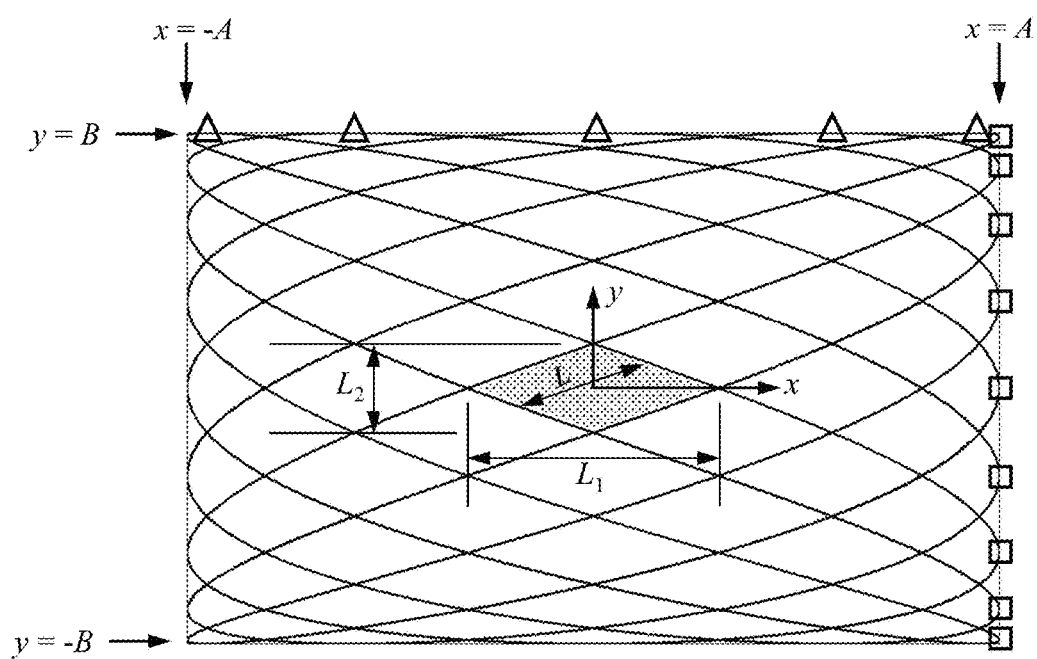
FIG. 3 illustrates a Lissajous scan trace, in accordance with an embodiment disclosed.

A Lissajous scan trace is depicted on the x-y plane in FIG. 3. The squares represent where the scan trace intersects with x=A; the triangles represent where the scan trace intersects with y=B. The number of the squares is defined as m, and that of the triangles as n. The closer a pattern formed by intersecting scan lines is to the center of the screen, the more it resembles a rhombus. The quasi-rhombus at the center of the screen (the shaded area in the figure) has diagonals of lengths $$L_1 \approx \frac{A\pi}{n} \text{ and } L_2 \approx \frac{B\pi}{m};$$

therefore, $$\frac{L_1}{L_2} \approx \frac{Am}{Bn},$$

and the larger is r, the flatter is the quasi-rhombus.

The size of the shaded area in FIG. 3 may serve as an indicator of the scan coverage. L in the figure, for example, can be expressed as $$L \approx \sqrt{\left(\frac{L_1}{2}\right)^2 + \left(\frac{L_2}{2}\right)^2} \text{ or } L \approx \frac{\pi}{2}\sqrt{\left(\frac{A}{n}\right)^2 + \left(\frac{B}{m}\right)^2}.$$

It is evident from the above expression that the larger m and n are, the smaller is L, and the higher the scan coverage. Moreover, from $$f_{rep} = \frac{f_x}{m} = \frac{f_y}{n},$$

given a $f_{rep}$, the larger m and n are, the higher $f_x$ and $f_y$ need to be. The fast-axial $f_x$ of a common MEMS scan component for projection is typically about 15 kHz or above. With $f_x$=20 kHz, for example, the largest m is about 833 when $f_{rep}$ is required to be 24 Hz or above.

FIGS. 4A to 4D illustrate scan traces under m=651 and different values of n. The frequency ratio r and $L_1/L_2$ are both larger in FIGS. 4A and 4B, where n is 22 and 44, respectively, rendering m/n greater than 10. There are clearly discernible dense and sparse portions on the projected screen of FIG. 4A. They can be observed in FIG. 4B, too, though they are less conspicuous in FIG. 4B than in FIG. 4A, due to a decreased r. The dense-sparse contrast is not immediately obvious in FIG. 4C, where n=68 and m/n is less than 10, and is much improved in FIG. 4D, where n=226 and m/n is less than 5. For example, in order to improve the dense-sparse contrast, for a fast-axial resonant frequency greater than 15 kHz, the slow-axial frequency has to be greater than 1.5 kHz given that m/n is 10, and the slow-axial frequency has to be greater than 3 kHz when m/n is less than or equal to 5.

Figure 4A:
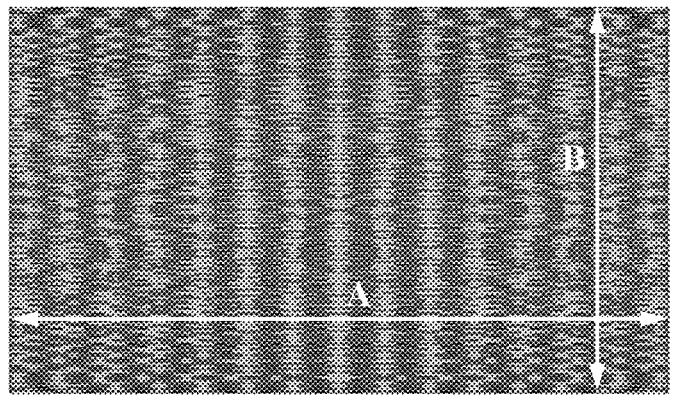
FIGS. 4A to 4D illustrate scan traces under different values of m and n.
Figure 4B:
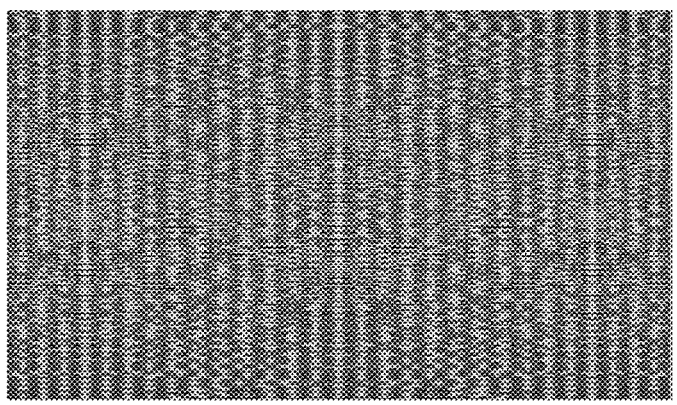
Figure 4C:
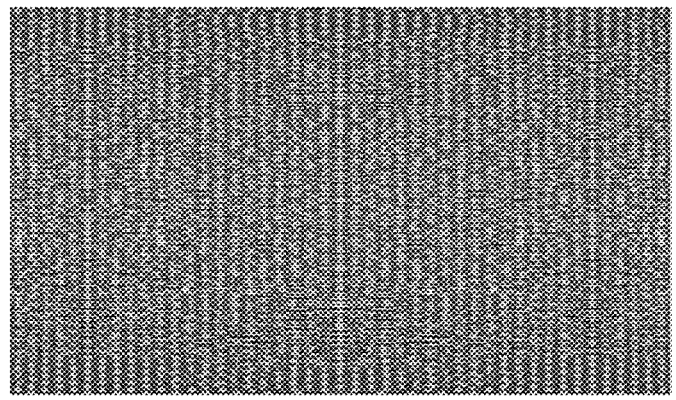
Figure 4D:
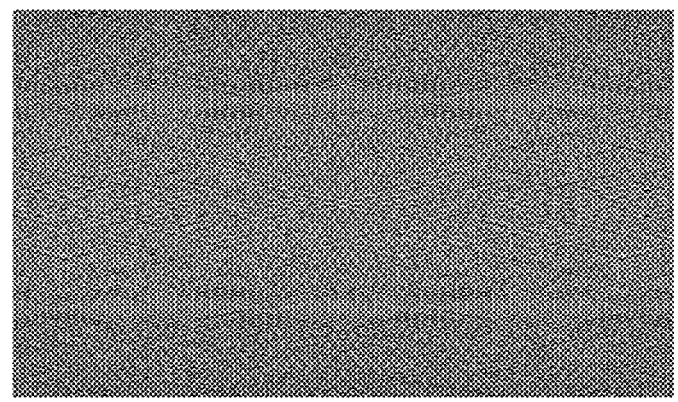
Figure 5A:
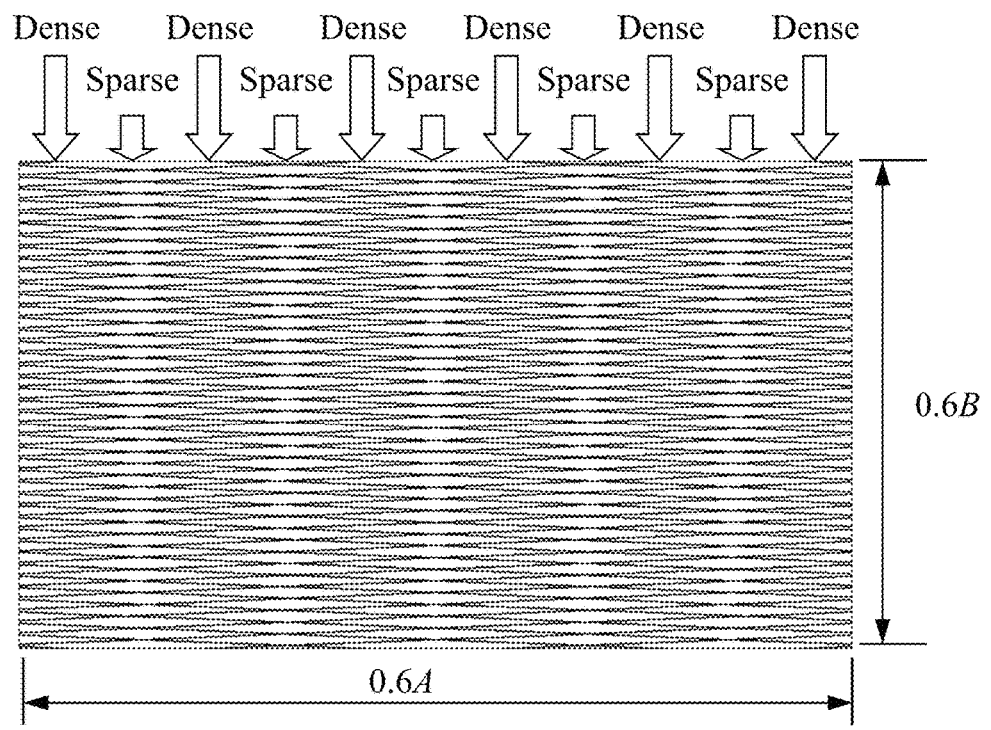
FIG. 5A is an enlargement in part of the scan trace of FIG. 4B.
Figure 5B:
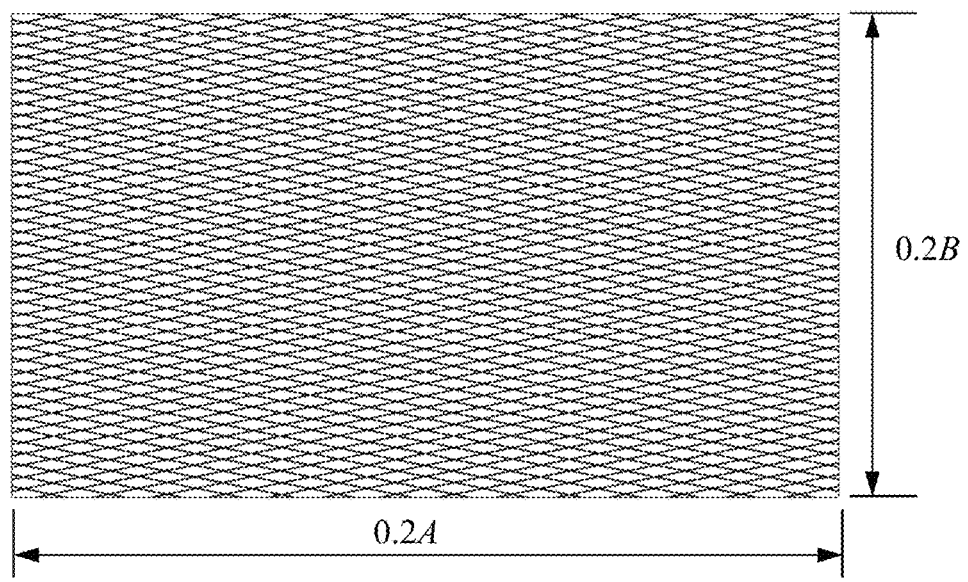
FIG. 5B is an enlargement in part of the scan trace of FIG. 4D.

As an enlargement in part of FIG. 4B, FIG. 5A shows a projected screen with clear dense and sparse portions due to the flat rhombi. FIG. 5B, on the other hand, is an enlargement in part of FIG. 4D, where the aspect ratio of the rhombi is lower, rendering the dense-sparse contrast almost nonexistent.

Figure 6:
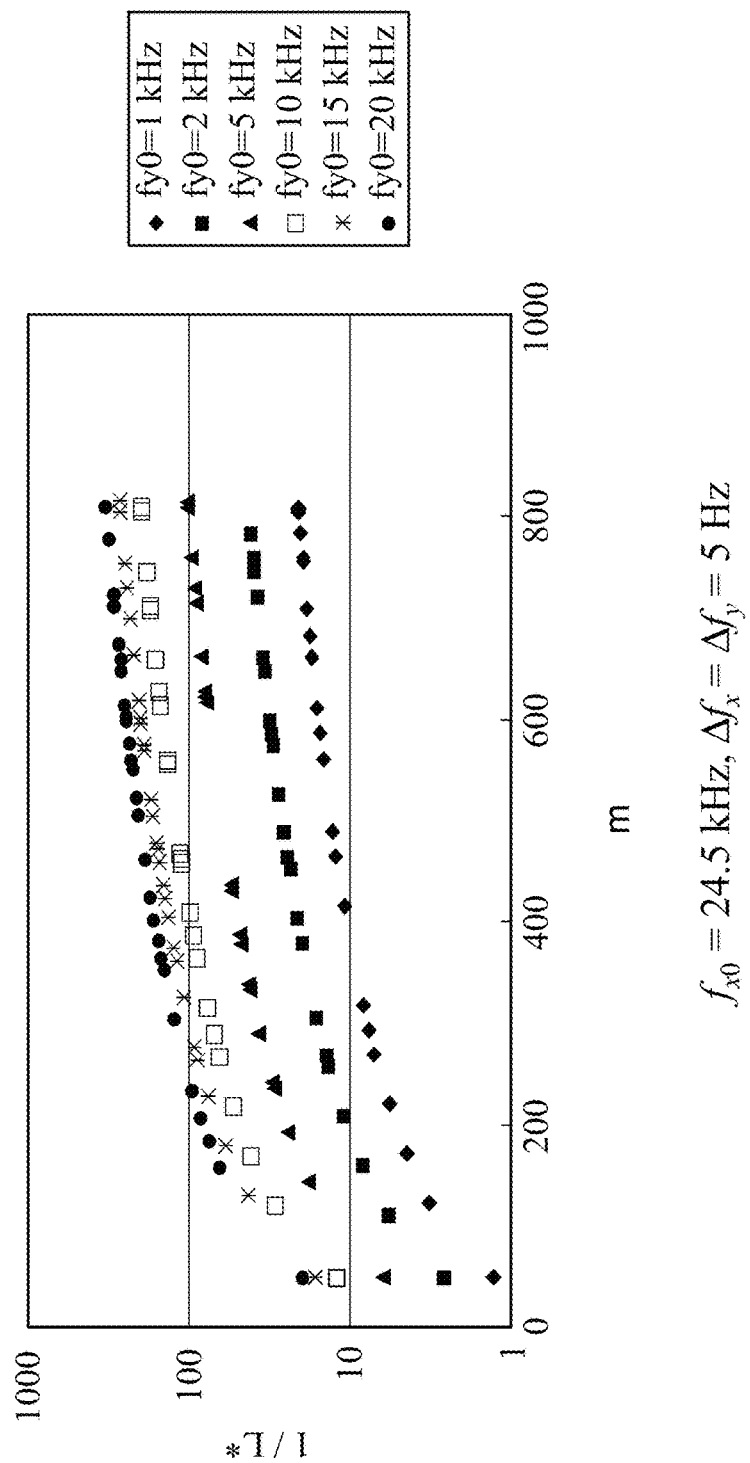
FIG. 6 illustrates the effect of slow-axial resonant frequency on scan line density.

FIG. 6 illustrates a feature of the present disclosure, i.e. increasing the slow-axial bias frequency. The effect on L* of increasing the slow-axial bias frequency is evident from the figure. Here L* is a dimensionless expression of L; that is, $$L^* \approx \frac{\pi}{2}\sqrt{\left(\frac{1}{n}\right)^2 + \left(\frac{1}{m}\right)^2}$$

with A=B=1. When the fast-axial resonant $f_{x0}$=24.5 kHz and $\Delta f_x = \Delta f_y$=5 Hz, the larger the slow-axial resonant $f_{y0}$ (from 1, 2, 5, 10, 15, to 20 kHz for instance), the larger 1/L* is and the smaller L* is for certain $f_x$ and $f_y$ pairings, giving rise to higher scan coverage.

A scan component of laser projection must operate at two frequencies, fast and slow, to from a Lissajous scan. The present disclosure provides a type of Lissajous scan frequency combination, attending to both coverage and flicker issues of Lissajous scan projections.

The slow axis is underutilized in prior art. Most prior art relates to mechanisms operating under high frequency ratios, which translate to low-frequency slow axes. In contrast, the slow-axial bias frequency is increased in the present disclosure to enhance the resolution of projected screens.

In addition, there is a trade-off between refresh rate and scan line density. When the ratio of the fast-axial bias frequency to the slow-axial bias frequency is greater than 10, the scan line density is low. According to the present disclosure, the scan line density is apparently increased when the ratio is less than 10, and especially so when it is less than 5.

Heightening the slow-axial frequency by lowering the ratio under the same refresh rate increases the scan line density 1/L* and the screen resolution. The screen is even more stable and flickers less when the refresh rate is increased. With the present disclosure, it is possible for Lissajous scans to achieve excellent projection quality without losing its merits like low driving power. Performance and cost, therefore, are reconciled.

The foregoing description has been presented for purposes of illustration. It is not exhaustive and does not limit the disclosure to the precise forms or embodiments disclosed. Modifications and adaptations will be apparent to those skilled in the art from consideration of the specification and practice of the disclosed embodiments. It is intended, therefore, that the specification and examples be considered as exemplary only, with a true scope and spirit of the disclosure being indicated by the following claims and their full scope of equivalents.

What is claimed is:

1. A scan frequency generation method of a Lissajous dual-axial scan component, the Lissajous dual-axial scan component configured to scan at a fast-axial resonant frequency and a slow-axial resonant frequency, the scan frequency generation method comprising:

determining a fast-axial bias frequency and a slow-axial bias frequency according to the fast-axial resonant frequency and the slow-axial resonant frequency, wherein a fast-axial frequency bias is a first positive range defined by a first difference between the fast-axial bias frequency and the fast-axial resonant frequency, and a slow-axial frequency bias is a second positive range defined by a second difference between the slow-axial bias frequency and the slow-axial resonant frequency;

determining a plurality of fast-axial positive integers and a plurality of slow-axial positive integers according to a system frequency, the fast-axial frequency bias and the fast-axial resonant frequency, the slow-axial frequency bias, and the slow-axial resonant frequency, according to following inequalities:

$$\frac{f_{clk}}{f_{x0} - \Delta f_x} \geq N \geq \frac{f_{clk}}{f_{x0} + \Delta f_x}; \quad (1)$$

and $$\frac{f_{clk}}{f_{y0} - \Delta f_y} \geq M \geq \frac{f_{clk}}{f_{y0} + \Delta f_y}, \quad (2)$$

wherein M is one of the plurality of fast-axial positive integers, N is one of the plurality of slow-axial positive integers, $f_{clk}$ is the system frequency, $\Delta f_x$ is the fast-axial frequency bias, $\Delta f_y$ is the slow-axial frequency bias, $f_{x0}$ is the fast-axial resonant frequency, and $f_{y0}$ is the slow-axial resonant frequency;

determining an irreducible fraction according to the fast-axial positive integers and the slow-axial positive integers, the irreducible fraction being a ratio of the fast-axial bias frequency to the slow-axial bias frequency, the ratio being less than 10; and scanning by the Lissajous dual-axial scan component according to a scan trace repetition frequency and the ratio, the scan trace repetition frequency being greater than 24 Hz.

2. The scan frequency generation method of claim 1, wherein the fast-axial resonant frequency or the slow-axial resonant frequency is a resonant frequency associated with a maximum scanning angle.

3. The scan frequency generation method of claim 1, wherein the fast-axial resonant frequency is greater than 15 kHz.

4. The scan frequency generation method of claim 3, wherein the slow-axial resonant frequency is greater than 1.5 kHz.

5. The scan frequency generation method of claim 1, wherein the ratio is less than 5.

6. The scan frequency generation method of claim 5, wherein the fast-axial resonant frequency is greater than 15 kHz.

7. The scan frequency generation method of claim 6, wherein the slow-axial resonant frequency is greater than 3 kHz.

* * * * *